(12) United States Patent
Seo et al.

(10) Patent No.: US 10,063,955 B2
(45) Date of Patent: Aug. 28, 2018

(54) PORTABLE ELECTRONIC EQUIPMENT

(71) Applicant: LG Electronics Inc., Seoul (KR)

(72) Inventors: Sangwoo Seo, Seoul (KR); Seolyong Shin, Seoul (KR); Hyunsun Yoo, Seoul (KR); Jungyoun Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 211 days.

(21) Appl. No.: 15/203,090

(22) Filed: Jul. 6, 2016

(65) Prior Publication Data

US 2017/0311072 A1    Oct. 26, 2017

(30) Foreign Application Priority Data

Apr. 22, 2016  (KR) .......................... 10-2016-0049507

(51) Int. Cl.
| | |
|---|---|
| *H04R 25/00* | (2006.01) |
| *H04R 1/10* | (2006.01) |
| *H04M 1/02* | (2006.01) |
| *H04M 1/05* | (2006.01) |
| *H01H 13/00* | (2006.01) |
| *H04R 5/033* | (2006.01) |

(52) U.S. Cl.
CPC .......... *H04R 1/1041* (2013.01); *H01H 13/00* (2013.01); *H04M 1/02* (2013.01); *H04M 1/05* (2013.01); *H04R 1/1066* (2013.01); *H04R 5/0335* (2013.01); *H04R 2201/107* (2013.01); *H04R 2420/07* (2013.01)

(58) Field of Classification Search
CPC . H04R 1/1041; H04R 1/1066; H04R 2420/07

USPC ........................................................ 381/384
See application file for complete search history.

(56) References Cited

U.S. PATENT DOCUMENTS

| | | |
|---|---|---|
| 6,771,992 B1 | 8/2004 | Tomura et al. |
| 2008/0015000 A1 | 1/2008 | Jung |

(Continued)

FOREIGN PATENT DOCUMENTS

| | | |
|---|---|---|
| EP | 2802155 A1 | 11/2014 |
| KR | 10-1999-011276 A | 2/1999 |

(Continued)

OTHER PUBLICATIONS

LG Electronics Mobilecomm USA, Inc., "Newly Redesigned LG Tone Pro™ Newest Addtion . . . ," retrieved from URL:http://www.prnewswire.com/news-releases/newly-redesigned-lg-tone-pro-newest-addition-to-award-winning-bluetoothdheadset-series-300072083.html, Apr. 27, 2015, 1 page.

*Primary Examiner* — Sean H Nguyen (74) *Attorney, Agent, or Firm* — Birch, Stewart, Kolasch & Birch, LLP (57) ABSTRACT

A portable electronic device including a housing; a button hole formed in the housing; and a button unit arranged in the button hole of the housing is provided. The button unit includes a top button coupled to the housing and covering the button hole, with a first direction length larger than a second direction length; a button frame provided in the housing, with one portion in the second direction coupled to a bottom of the top button and the other portion in the second direction coupled to an internal space of the housing; an actuator projected from a bottom surface of the button frame; and a dome switch pressed by the actuator and generating a signal, when the top button is pressed.

18 Claims, 7 Drawing Sheets

(56) References Cited

U.S. PATENT DOCUMENTS

| | | |
|---|---|---|
| 2009/0318198 A1 | 12/2009 | Carroll |
| 2010/0054493 A1* | 3/2010 | Lin ...................... H01H 9/0228 |
| | | 381/74 |
| 2010/0166243 A1* | 7/2010 | Siskin ..................... A61F 11/14 |
| | | 381/334 |
| 2011/0194710 A1* | 8/2011 | Prest .................. H01H 13/7057 |
| | | 381/122 |
| 2015/0092345 A1 | 4/2015 | Ely |

FOREIGN PATENT DOCUMENTS

| | | |
|---|---|---|
| KR | 10-2009-0046268 A | 5/2009 |
| KR | 10-2011-0105249 A | 9/2011 |
| KR | 10-2011-0115720 A | 10/2011 |
| KR | 10-1542598 B1 | 8/2015 |
| KR | 10-2016-0034744 A | 3/2016 |
| WO | WO 2012/084032 A1 | 6/2012 |
| WO | WO 2015/056443 A1 | 4/2015 |

* cited by examiner

PORTABLE ELECTRONIC EQUIPMENT

CROSS-REFERENCE TO RELATED APPLICATIONS

This application claims priority to Korean Patent Application No. 10-2016-0049507, filed on Apr. 22, 2016, the entire contents of which is hereby incorporated by reference in its entirety.

BACKGROUND OF THE DISCLOSURE

Field of the Disclosure

Embodiments of the present disclosure relate to portable electronic equipment which may receive a sound signal from a terminal via wireless communication and control the terminal according to a signal input via a user input unit.

Background of the Disclosure

Electronic equipment means a sound system receiving a sound signal from a terminal and transmitting the information collected via a microphone. Conventional electronic equipment uses a wire system configured to receive a sound signal from a terminal having an ear jack plugged in a ground of the electronic equipment. Considering mobility and use convenience, there are increasing demands for portable electronic equipment using wireless communication scheme.

Portable electronic equipment having a design considering portability is being developed. Such portable electronic equipment having the design considering portability includes a headphone type wearable on a user's head in a band shape, an ear hook type and an ear insertion type. Because the portable electronic equipment is worn on the user's neck, sweat on the user's body or rain is likely to flow into the portable electronic equipment. Accordingly, there is a need for the portable electronic equipment to have a good waterproof performance.

In addition, in general the user will not press a button provided in the portable electronic equipment, while actually looking at the button. As the button increases in size, use convenience is improved and the portable electronic equipment is worn on the user's neck stably. Accordingly, there are other needs for the portable electronic equipment having the structure improving use convenience and facilitating stable wearing on the user's neck.

SUMMARY OF THE DISCLOSURE

Accordingly, an object of the present invention is to address the above-noted problems and other problems.

An object of the present disclosure is to provide a portable electronic equipment which receives a sound signal from a terminal via wireless communication and control the terminal according to a signal input via a user input unit, so that sweat or water may be prevented from flowing through the button and the internal electronic components may not be affected by the water flowing through the button. Accordingly, the malfunction or errors generated by moisture penetration may be reduced.

Embodiments of the present disclosure may provide a portable electronic equipment comprising a housing; a button hole formed in the housing; and a button unit arranged in the button hole of the housing, wherein the button unit comprises a top button coupled to the housing and covering the button hole, with a first direction length larger than a second direction length; a button frame provided in the housing, with one portion in the second direction coupled to a bottom of the top button and the other portion in the second direction coupled to an internal space of the housing; an actuator projected from a bottom surface of the button frame; and a dome switch pressed by the actuator and generating a signal, when the top button is pressed.

The first direction may be a traverse direction of the housing and the second direction is a longitudinal direction of the housing, and the first direction length of the top button may be equal to the width of the housing.

The button hole may be provided in a top surface of the housing, and the top button and the top surface of the housing may comprise a curved surface inclined toward an end portion from a central portion in the first direction.

The housing may further comprise a button seating portion inserted inwards corresponding to the thickness of the top button, the button seating portion having a certain size corresponding to the top button.

The button seating portion may comprise a lateral wall having both first direction sides which are open and both second direction sides which form a step with the top surface of the housing.

The portable electronic equipment may further comprise a water collecting groove formed in the button seating portion near the button hole.

The water collecting groove may be formed in the both first direction sides of the button seating portion and extended in the second direction.

The housing may comprise an upper case defining the top surface and an upper lateral wall of the housing; and a lower case defining a lower lateral wall and a bottom surface of the housing, and the button seating portion is inserted corresponding to the thickness of the upper lateral wall of the upper case and the upper lateral wall is omitted.

An end of the upper lateral wall and an end of the lower lateral wall may contact with each other, and the button seating portion may be inserted in a direction to the center from the first direction ends to expose the end of the lower lateral wall and to form a gap with the lower lateral wall.

Both first direction ends of the top button may contact with the end of the lower lateral wall, and the top button may cover the gap.

The portable electronic equipment may further comprise a first coupling projection projected from a bottom surface of the top button; and a first coupling hole formed in certain area of the button frame, corresponding to the first coupling projection.

The portable electronic equipment may further comprise a second coupling projection projected from the top surface of the housing; and a second coupling hole formed in the other area of the button frame, corresponding to the second coupling projection.

The portable electronic equipment may further comprise an elastic band comprising both ends where the pair of the housings are coupled, respectively, wherein a cross section area of the elastic band is polygonal.

The elastic band may be formed in a tube shape with an internal space penetrating both ends, and a cross section area of the internal space may be asymmetrical with respect to an outer circumference of the elastic band, and the lateral wall of the tube-shaped elastic band may have the thickness which is not uniform.

A cross section area of the elastic band may have a rectangular shape, and a cross section arear of the internal space may have a rhombus shape inclined with respect to the rectangular shape of the elastic band.

The portable electronic equipment may further comprise a signal cable transceiving a signal between internal electronic components mounted in the pair of the housings, penetrating the internal space; and one or more cable holders arranged in the internal space, with an outer circumference corresponding to the cross section shape of the internal space and an inner circumference having a hole where the signal cable passes.

Embodiments of the present disclosure may also provide a portable electronic equipment comprising an elastic band flexible in a C-shape; a pair of housings connected to both ends of the elastic band; a button hole formed in the housing; and a button unit provided in the button hole of the housing, wherein a cross section area of the elastic band is polygonal.

The elastic band may be formed in a tube shape with an internal space penetrating both ends, and a cross section area of the internal space may be asymmetrical with respect to an outer circumference of the elastic band, and the lateral wall of the tube-shaped elastic band may have the thickness which is not uniform.

A cross section area of the elastic band may have a rectangular shape, and a cross section arear of the internal space may have a rhombus shape inclined with respect to the rectangular shape of the elastic band.

The button unit may comprise a top button coupled to the housing and covering the button hole, with a first direction length larger than a second direction length; a button frame provided in the housing, with one portion in the second direction coupled to a bottom of the top button and the other portion in the second direction coupled to an internal space of the housing; an actuator projected from a bottom surface of the button frame; and a dome switch pressed by the actuator and generating a signal, when the top button is pressed.

According to the embodiments of the present disclosure, the portable electronic equipment in accordance with the present disclosure has the effect that the size of the button is increased to look the button as a part of the case in a design aspect. Even if the button is too large, the user's unintended input generated by pressing the button unintentionally may be prevented.

Furthermore, sweat or water may be prevented from flowing through the button and the internal electronic components may not be affected by the water flowing through the button. Accordingly, the malfunction or errors generated by moisture penetration may be reduced.

Still further, the shape of the elastic band is improved and the contact points with the user's neck are increased. Accordingly, the twisting or deformation may be minimized by the improved shape of the elastic band and the wearing comfort may be improved.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
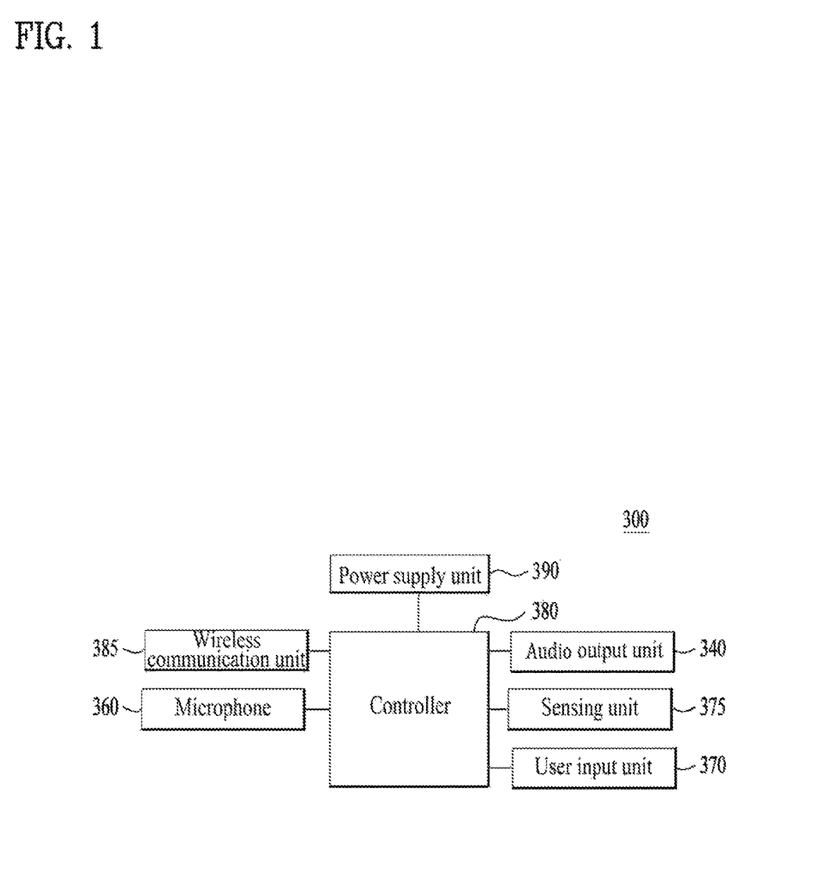
FIG. 1 is a block diagram illustrating a structure of portable electronic equipment.

Reference is now made to FIG. 1 which a block diagram illustrating a structure of portable electronic equipment 300. The portable electronic equipment 300 is shown having components such as a controller 380, a wireless communication unit 385, an audio output module 340, a sensing unit 375, a microphone 360, a user input unit 370 and a power supply unit 390.

The audio output module 340 is configured to output sound according to an audio signal and examples of the audio output module 340 includes an earbud 341 stuck in the ear to transmit sound to the user.

The microphone 360 is configured to process an external sound signal into electrical voice data, such that the processed voice data may be transmitted to an external terminal or an external server using the wireless communication unit 385. In the microphone 360 may be realized diverse noise remove algorisms for removing the noise generated in a process of receiving the external sound signal.

The sensing unit 375 is configured to recognize a present state and peripheral information of the portable electronic equipment 300. Examples of the sensing unit 375 include an illuminance sensor for sensing ambient light, a touch sensor for sensing touch input, a gyro-sensor for sensing a slope and location of the portable electronic equipment 300, an earbud switch for sensing presence of the earbud 341 located in an earbud holder 325 and so on.

The user input unit 370 is configured for the user to control the portable electronic equipment 300. Examples of the user input unit 370 include a call/play button 371, a sound volume button, a power button, an accommodation button for allowing a sound cable 345 accommodated in the housing 320 and so on.

The user input unit 370 may include only a call button and a pair of sound volume buttons or it may further include a play/stop button and a music play order change button. The size of the portable electronic equipment 300 is restricted and the user often presses the buttons to input commands, without actually watching them. If many buttons are provided, it is difficult for the user to distinguish functions of the buttons from each other. Accordingly, a predetermined number of buttons are provided and the control commands which are able to be input may be expanded by combining the time, frequency of the button pressing and the provided buttons with each other.

The portable electronic equipment 300 keeps the state where it is worn on the user's body part and has less risk of being lost or misplaced. However, a conventional terminal is often lost. In this instance, the user presses two user input units provided in the portable electronic equipment and alarm of the connected terminal rings via BLUETOOTH™ so that the user can find the lost terminal.

Using a voice recording function of the BLUETOOTH™ connected terminal, the voice recorded and collected via the microphone 360 of the portable electronic equipment 300 may be stored in the connected terminal.

In the conventional terminal, only the functions related simply to calls or sound media playing are able to be controlled by using the portable electronic equipment 300. However, the portable electronic equipment 300 in accordance with the present disclosure has an expanded control range.

Figure 2:
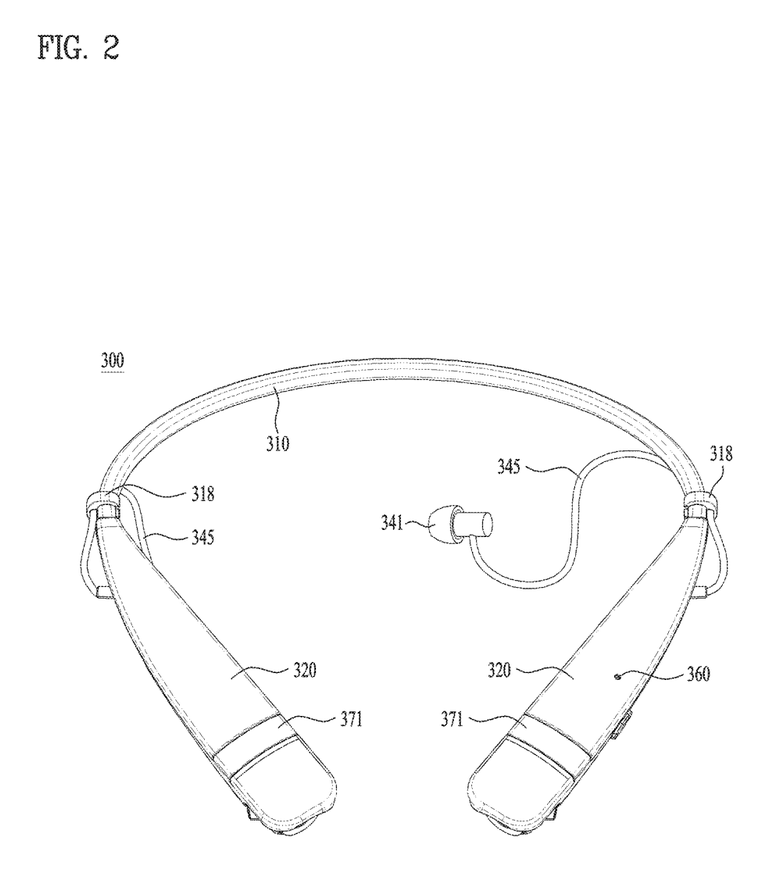
FIG. 2 is a perspective diagram illustrating one example of the portable electronic equipment in accordance with the present disclosure, viewed in one direction.

FIG. 2 is a perspective diagram illustrating one example of the portable electronic equipment 300 in accordance with the present disclosure, viewed in one direction. A body of the portable electronic equipment 300 includes an elastic band 310 and a housing 320. As shown in FIG. 2, the overall profile of the portable electronic equipment 300 forms a C-shaped curved line.

The elastic band 310 has a twisted tape shape with a surface and a thickness and it is located on a back side of the user's neck. An inner surface of the elastic band 310 is located on the back side of the user's neck and an outer surface is located toward the back side. A connected portion between the elastic band 310 and the housing 320 is twisted so that an outer surface of the housing arranged in both ends of the body may be located outwards and an inner surface may be located on the user's clavicle.

The elastic band 310 has elasticity. When a predetermined force is applied to the elastic band 310, the elastic band 310 is deformed and when the force is removed, the elastic band 310 returns to its prior shape. The housing 320 is coupled to both ends of the elastic band 310, to be located in both ends of the C-like curved line of the portable electronic equipment 300. Diverse components including a main board 381, a wireless communication unit 385, a battery 391 and a rotation module 350 may be inserted in inner and outer portions of the elastic band 310.

Figure 3:
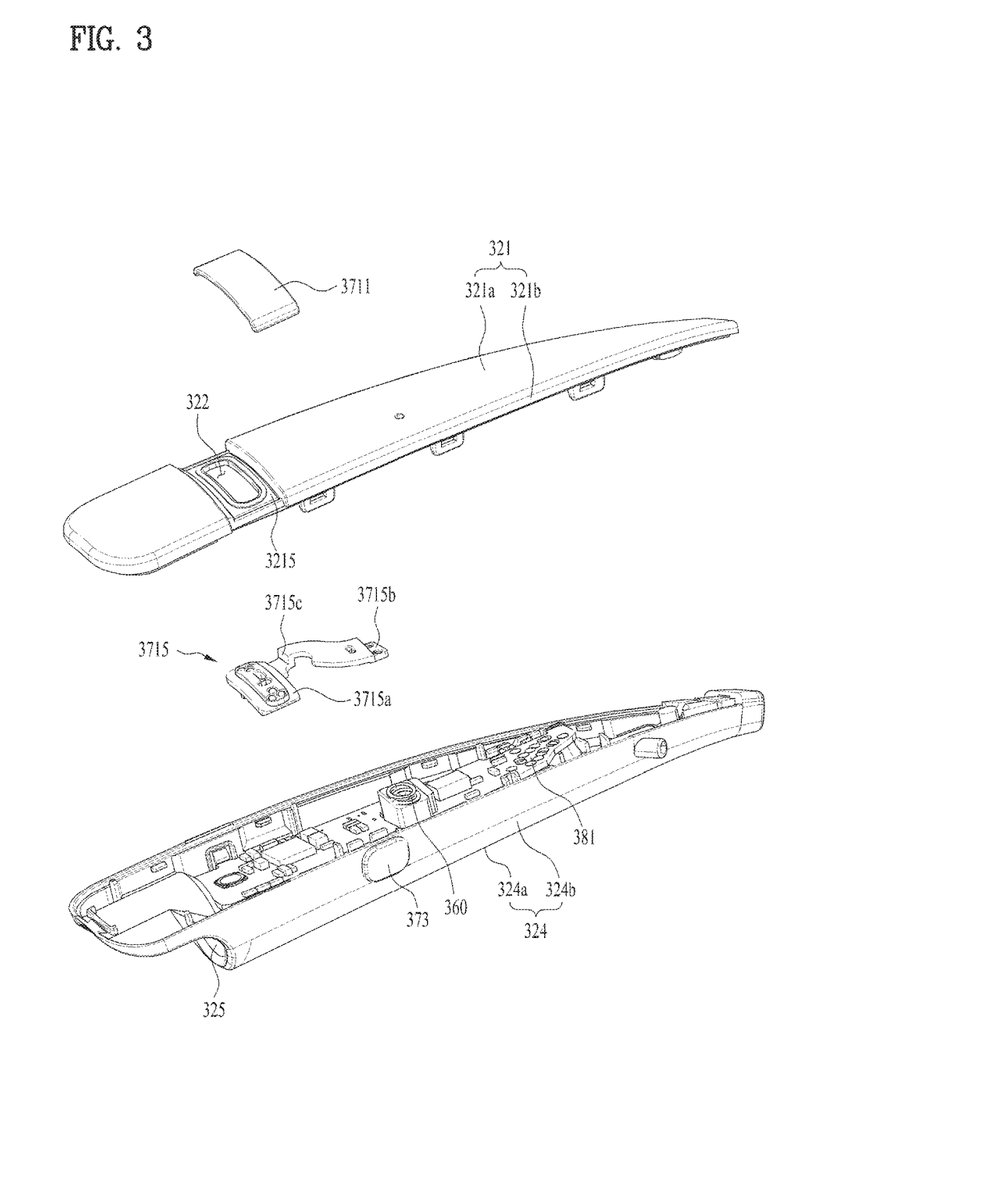
FIG. 3 is a perspective diagram illustrating a housing provided in one example of the portable electronic equipment.

C-shaped portable electronic equipment 300 may be worn and portable on the user's neck as shown in FIG. 3. A sensor 375 is provided in the elastic band 310 and senses whether the user puts on the portable electronic equipment 300 or not. For example, a displacement sensor for sensing curvature variation may be provided to sense whether the user widens ends of the portable electronic equipment when trying to wear it. In this instance, the curvature of the elastic band 310 is varied gently and it is determined whether the user tries to use the portable electronic equipment 300 so that the power of the portable electronic equipment 300 may be turned on or synchronized with an external terminal.

To determine more precisely whether the user put on the portable electronic equipment 300 or whether the ends of the portable electronic equipment 300 is widened while carried by the user, the displacement sensor may consider curvature after the curvature of the elastic sensor 310 is varied largely. The displacement sensor may determine that the user is wearing the portable electronic equipment 300, when the curvature of the elastic band 310 is largely varied at a first value and the curvature is then kept as a second value which is gentler than the value of the curvature in a state where the portable electronic equipment 300 is rested.

As well as the displacement sensor, a temperature sensor, an optical sensor or a heart rate sensor may be provided on a wearing surface with the user's neck. If the sensed temperature is in a human normal temperature range, if ambient light becomes dark or if a hear rate is sensed, it is determined that the user is wearing the portable electronic equipment 300 and the power of the portable electronic equipment 300 is switched off or the wireless communication unit 385 is implemented to synchronize the portable electronic equipment 300 with an external terminal.

As another example, a switch 373 pressed in a physical way may be provided. When the user wears the portable electronic equipment 300, the projected switch 373 is pressed to generate an ON signal. In case the ON state of the switch 373 is constant for a preset time period, the power of the portable electronic equipment 300 is on or synchronized with an external terminal.

A plurality of the sensors 375 and a plurality of the switches 373 may be provided so that the equipment wearing may be determined precisely by combining several values.

Figure 4:
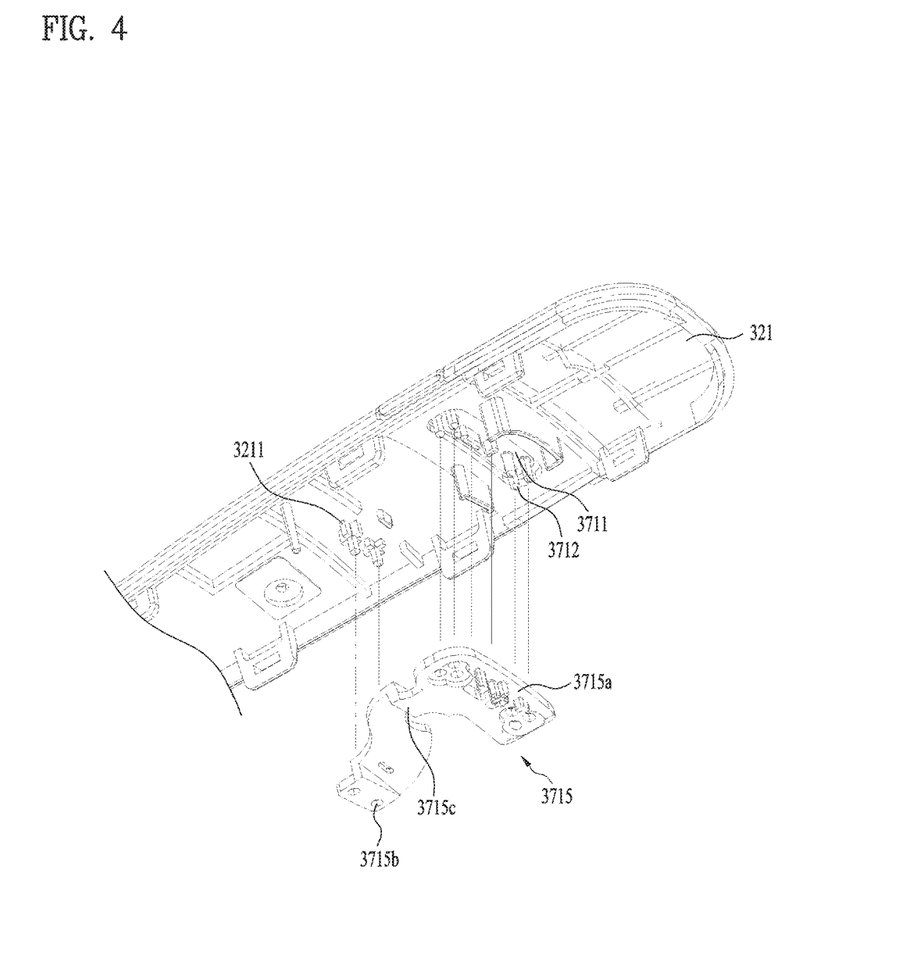
FIG. 4 is a diagram illustrating an upper case provided in one example of the portable electronic equipment, viewed from a bottom.

FIG. 3 is a perspective diagram illustrating a housing 320 provided in one example of the portable electronic equipment 300 and FIG. 4 is a diagram illustrating an upper case 321 provided in one example of the portable electronic equipment 300, viewed from a bottom.

The housing 320 coupled to each end of the elastic band 310 includes an upper case 321 and a lower case 324. Between the upper case 321 and the lower case 324 may be mounted the main board 381, the wireless communication unit 385, the battery 391, the microphone 360 and a rotation module 350.

The housing 320 is fabricated by injection-molding polymer. For example, the housing 320 may be fabricated as a plastic product with a predetermined strength using polystyrene and it may partially include a different material such as metal, glass or leather.

Thermoplastic polyurethane (TPU) used in the elastic band 310 has certain elasticity to be easily deformed. When the force applied to the elastic band 310 is removed, the elastic band 310 is restored to its prior shape. Also, the elastic band 310 formed of TPU has a surface with a high friction coefficient enough to closely contact with the user's body part.

The housing 320 is formed of polystyrene having a certain rigidity to protect internal components and polyurethane is coated on the surface of the housing 320 to make the housing contact with the user's body part closely at the same time. When Polyurethane is coated on the surface of the housing 320, the exterior appearance of the portable electronic equipment 300 is able to have uniformity and both the elastic band 310 and the housing 320 may closely contact with the user's skin. Accordingly, the portable electronic equipment 300 may not shake according to the user's movement and have an advantage of good wearing comfort.

The portable electronic equipment 300 wearable on a body part seems to be exposed to moisture such as sweat. If provided with a waterproof function, the portable electronic equipment 300 may have improved durability. A rib covering the gap between the upper case 321 and the lower case 324 is formed or a waterproof material is disposed between the upper case 321 and the lower case 324 so as to prevent water penetration. If the polyurethane coating is performed even without any auxiliary waterproof material, the upper case 321 and the lower case 324 may be very close to each other.

The wireless communication unit 385, the microphone 360 and the like may be mounted in the main board 381 mounted in the housing 320 in accordance with the present disclosure. The main board 381 is connected to the battery 391, the user input unit 370 and the audio output unit 340. The components mounted in the housing 320 may be arranged symmetrically or the components provided in one housing may be used via a signal wire 382 mounted in the elastic band 310. For example, in case the wireless communication unit 385 is provided in the housing 320 of one side, sound may be output through the earbuds arranged in both sides according to the sound signal received by the wireless communication unit 385.

The wireless communication unit 385 may be mounted in the main board 381 or formed in the surface of the housing 320, to transceive a signal with an external terminal. The wireless communication unit 385 is synchronized with the external terminal, using short range wireless communication such as BLUETOOTH™ and then receives a control signal and a sound signal from the external terminal. Alternatively, the wireless communication unit 385 transmits the control command or sound signal input via the user input unit 370 or the microphone 360 of the portable electronic equipment 300 to the external terminal.

The housing 320 may include a power button for power ON and OFF, a button only for playing or calling and a direction key for adjusting sound volume (the direction key which may be used only for controlling to play the former track or the next track of the currently playing track). Dome keys pressed physically or touch keys sensing capacity variation may be used as the buttons.

In case of the touch key, the location is not limited and the surface of the housing 320 is used diversely for the location of the touch key. When the touch key is realized in the surface of the housing 320, LED may be provided in the area of the surface where the touch key is realized and a location and function of the touch key may be displayed. The earbud 341 is inserted in the user's ear and transmits sound. The earbud 341 is connected with the main board 381 via a sound cable 345. The main board 381 controls the earbud 341 to output sound according to the sound signal.

The button 371 for playing/calling may be arranged in an upper surface of the housing 320, in other words, in a forward direction when the user wears the portable electronic equipment 300. The inside of the button 371 is connected to the outside via a button hole 322 formed in the housing 320. The button 371 for playing and calling consists of a top button 3711 arranged the outside of the housing 320 and a button frame 3715 provided in the housing 320.

A button seating portion 3215 is formed in the upper case 321 of the housing 320, corresponding to the portion where the top button 3711 as shown in FIG. 3. When insertedly coupled to the button seating portion 3215 inserted downwards from the upper case 321, corresponding to the thickness of the top button 3711, the top button 3711 is arranged side by side with the top surface of the upper case 321 and there is no step.

Both sides of the button seating portion 3215 are open in a first direction and both sides in a second direction are closed, while forming a step with respect to the upper case 321. The top button 3711 is extended horizontally and vertically in the first direction so as to cover the both open sides in the first direction of the button seating portion 3215.

As shown in FIG. 3, the upper case 321 forms an upper lateral wall 321b with a top surface 321a of the housing 320 and the lower case 324 forms a lower lateral wall 324b with a bottom surface 324a of the housing 320. While an end of the upper lateral wall 321b contacts with an end of the lower lateral wall 324b, an internal space of the housing 320 may be defined.

At this time, the top button 3711 covers the upper lateral wall 321b omitted in the first direction of the button seating portion 3215. In other words, the top button 3711 includes a lateral surface 3711b extended horizontally and vertically in the first direction and arranged side by side with the upper lateral wall 321b. A shape of the first direction top surface of the upper case 321 may be equal to a shape of the first direction top surface of the top button 3711.

The button seating portion 3215 shown in FIG. 4 is projected toward the internal space of the housing 320.

The top button 3711 in the example of the present disclosure has a rectangular shape long in first direction and short in a second direction. The first direction is a direction along the width of the housing 320 and the second direction may be a longitudinal direction of the housing 320.

In the conventional portable electronic equipment, the top button is circular or occupies a small area. Even when the user presses any area of the top button, the same strength is applied to the top button. However, in case of a long rectangular-shaped top button 3711, the force applied thereto may be variable according to what area of the top button the user presses and there might be a disadvantage of failure in pressing the dome switch 3718 disposed inside the housing.

To solve the disadvantage, a first coupling projection 3712 is provided and the first coupling projection 3712 is inserted in a first coupling hole formed in a certain area 3715*a* in the second direction with respect to a button frame 3715 provided in the housing 320, so that the top button 3711 may be coupled to the button frame 3715. A second coupling projection 32111 projected downwards from the top case 321 is inserted in a second coupling hole formed in the other area 3715*b* of the button frame 3715 so that the button frame 3715 may be fixed to the housing 320.

At this time, a certain area of the button frame 3715 is located in the button seating portion 3215 and the other area is located outside the button seating portion 3215. Accordingly, the step generated between the button seating portion 3215 and the top surface of the upper case 321 is also shown in the upper case 321, such that a step may be formed corresponding to a border with the button seating portion 3215 of the button frame 3715.

The other area 3715*b* of the button frame 3715 coupled to the upper case 321 is fixed and one area 3715*a* of the button frame 3715 coupled to the top button 3711 is moved along a direction in which the top button 3711 is pressed.

An actuator 3716 projected from a bottom surface of the button frame 3715 may press the dome switch 3718 to generate a signal.

Figure 5A:
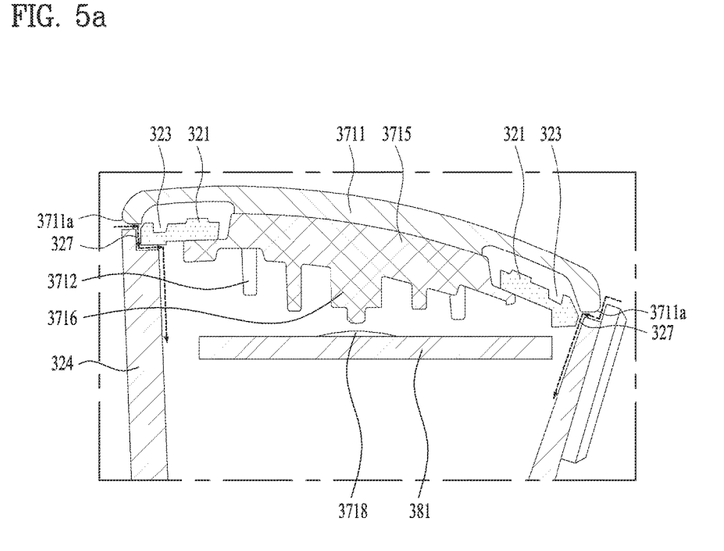
FIGS. 5a and 5b are sectional diagrams illustrating a button unit provided in one example of the portable electronic equipment.
Figure 5B:
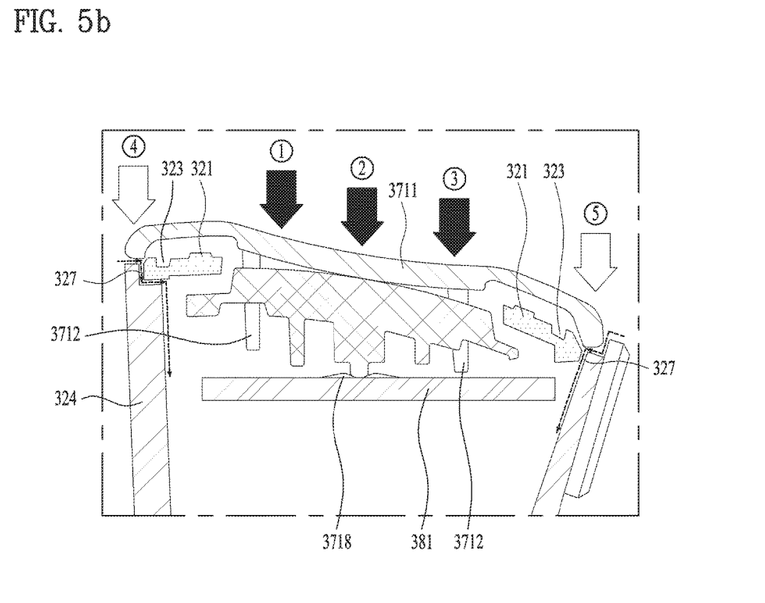

FIGS. 5*a* and 5*b* are sectional diagrams illustrating a button 371 provided in one example of the portable electronic equipment 300. FIG. 5*a* illustrates the button before the user presses the top button 3711 and FIG. 5*b* illustrates when the user is pressing the top button 3711.

The top surface of the housing provided in the portable electronic equipment in accordance with the present disclosure may be formed in a curved shape with a central portion more projected than the other portions in the first direction. When the top surface is formed in the curved shape, the user is likely to press a relatively center portion and there is an effect of moisture flowing horizontally.

The top button 3711 is longer in the first direction. When the user presses an area far from the first direction center, the opposite area of the top button 3711 might rises and there might be an error of failure in pressing the dome switch. However, the portable electronic equipment 300 in accordance with the present disclosure includes a button frame 3715 longitudinally extended in the second direction, with the other portion in the second direction coupled to the upper case 321. Even if the user presses one of the first direction portions ①, ②, ③ of the top button 3711, one second direction portion of the button frame 3715 is moving in an arc with respect to the second direction other portion fixed to the upper case. Accordingly, the error of the failure in pressing the dome switch 3718 may be reduced.

The first direction of the top button 3711 is equal to the width of the housing 320 and both ends of the top button 3711 are located in a top corner of the housing 320 as shown in FIGS. 5*a* and 5*b*. The corner of the housing might be pressed even the user does not try to press it. For example, while putting the portable electronic equipment 300 in a bag, the end of the top button 3711 might be pressed by other items in the bag. In this instance, both corners 3711*a* of the top button 3711 are supported by the housing 320, more particularly, the end of the lower lateral wall 324*b*. Even if the top button is pressed downwards at ④ or ⑤, the top button 3711 will not be pressed and the location of the top button may be fixed.

The first direction horizontal portion of the upper case 321, corresponding to the button seating portion 3215, is disposed inwards to expose the lower lateral wall 324*b* of the lower case 324 and more inwards to form a gap 327 with the lower lateral wall 324 of the lower case 324. Water may flow along a direction of an arrow shown in FIGS. 5*a* and 5*b* trough the gap 327. The water flowing through the button hole 322 directly affect the main board 381. Because of that, water may be guided to flow to the area displaced apart from the main board 381 and the effect of the water on the electronic components such as the main board 381 may be minimized.

Figure 6:
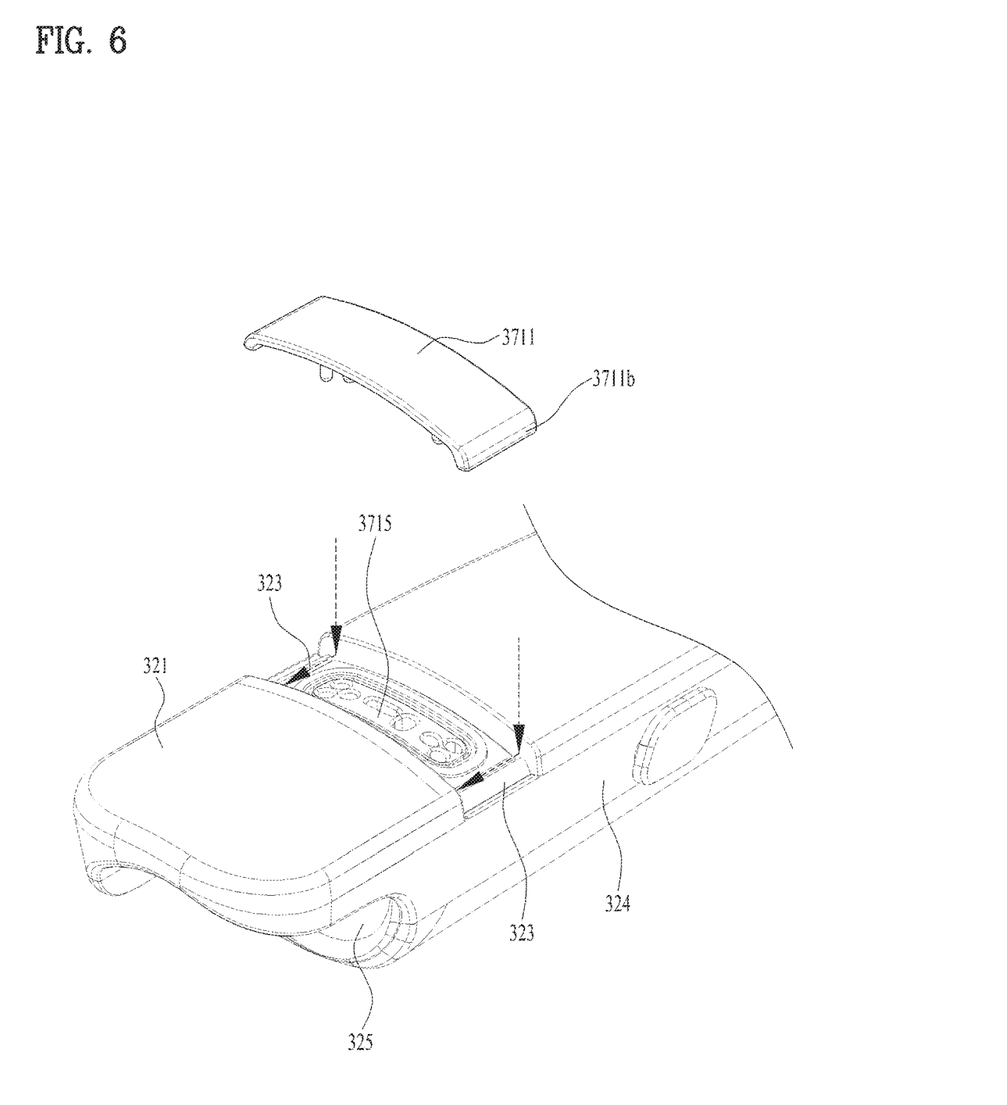
FIG. 6 is a diagram illustrating a water collecting groove formed in a button sitting portion provided in the example of the portable electronic equipment.

FIG. 6 is a diagram illustrating a water or liquid collecting groove 323 formed in a button seating portion 3215 provided in the example of the portable electronic equipment 300. The water collecting groove 323 formed near the button hole 322 collects sweat or water before reaching the button hole 322, so that sweat or water may be prevented from flowing in the button hole 322.

The water collecting groove 323 may be formed to surround a circumference of the button hole 322. As another example shown in FIG. 6, the water collecting groove 323 may be extended in the second direction which is a horizontal direction as shown in FIG. 6. Water may flow along an arrow shown in FIG. 6 and collect in the water collecting groove 323, to prevent the water penetration into the button hole 322.

Figure 7:
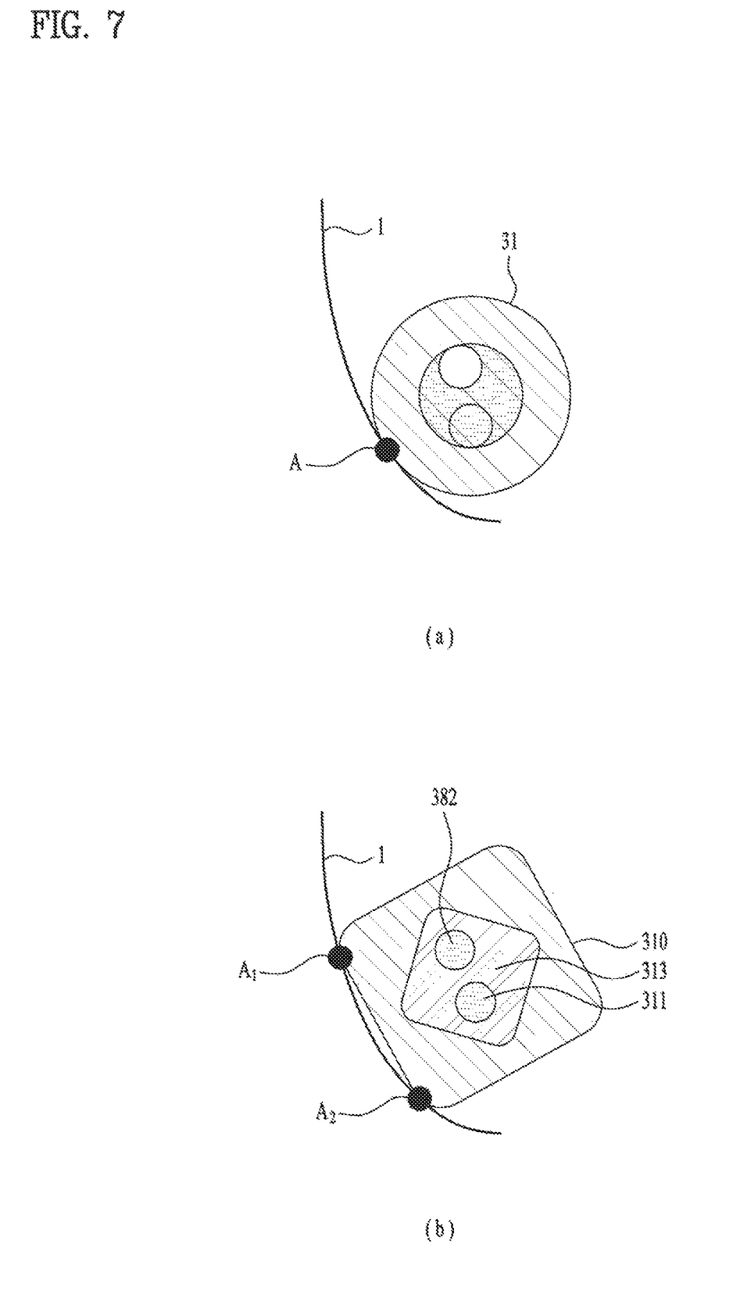
FIG. 7 is a diagram illustrating one example of an elastic band portion which contacts with a user's neck when one example of the portable electronic equipment is worn.

FIG. 7 is a diagram illustrating one example of the elastic band 310 which contacts with the user's neck when the user wears one example of the portable electronic equipment. FIG. 7 (*a*) is a sectional diagram of a conventional elastic band 310 and FIG. 7 (*b*) is a sectional diagram of the elastic band 310 in accordance with the present disclosure. The elastic band 310 has a polygonal shape. More points (A1 and A2) of the elastic band 310 contact with the user's neck 1 than a point (A) of the conventional elastic band 410 having a circular shape.

As it has more points in contact with the user's neck 1, the elastic band 310 may be rested on the neck 1 stably. Accordingly, the problem of right-and-left or vertical movement could be reduced and the wearing comfort may be improved effectively.

A signal wire 382 and the like may be arranged in the elastic band 310 and the elastic band 310 has a tube shape with an internal space. The conventional elastic band 310 shown in FIG. 7 (*a*) is a tube type with the uniform thickness. The elastic band 310 in accordance with the present disclosure shown in FIG. 7 (*b*) is a tube type with the not-uniform thickness between an outer circumferential surface and an internal space in a cross section area. When the elastic band 310 is rectangular as shown in FIG. 7 (*b*), the internal space forms a rhombus shape which is twisted at 45 degrees and the corners of the rectangular shape gets relatively thick so as to enhance the rigidity of the elastic band.

A shape-memory alloy 311 and a cable holder 313 for fixing the signal wire 382 may be provided in the elastic band 310. If the cable holder 313 is arranged in an overall portion of the elastic band 310, the elasticity of the elastic band 310 might deteriorate. Accordingly, the cable holder 313 may be partially arranged in the elastic band 310 (for example, both ends of the elastic band 310).

As described above, the portable electronic equipment 300 in accordance with the present disclosure has the effect that the size of the button 371 is increased to look the button 371 as a part of the case in a design aspect. Even if the button 371 is too large, the user's unintended input generated by pressing the button unintentionally may be prevented.

Furthermore, sweat or water may be prevented from flowing through the button 371 and the internal electronic components may not be affected by the water flowing through the button 371. Accordingly, the malfunction or errors generated by moisture penetration may be reduced.

Still further, the shape of the elastic band 310 is improved and the contact points with the user's neck are increased. Accordingly, the twisting or deformation may be minimized by the improved shape of the elastic band 310 and the wearing comfort may be improved.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A portable electronic device comprising:
   a housing having an internal space;
   a button hole formed in the housing;
   a button unit arranged in the button hole of the housing; and
   a button seating portion to receive the button unit therein,
   wherein the button unit includes:
      a top button coupled to the housing to cover the button hole, the top button having a first length in a first direction that is longer than a second length in a second direction thereof, and the top button having an exposed top surface and a bottom surface;
      a button frame provided in the housing, one portion of the button frame being coupled to the bottom surface of the top button, another portion of the button frame being located in the internal space of the housing and coupled to the housing, and a bottom surface of the button frame having an actuator projecting therefrom; and
      a dome switch pressable by the actuator to generate a signal when the top button is pressed, and
   wherein the button seating portion is recessed downward from a top surface of the housing to a depth equal to a thickness of the top button.

2. The portable electronic device of claim 1, wherein the first direction is a traverse direction of the housing, and the second direction is a longitudinal direction of the housing, and
   wherein the first length of the top button is equal to a width of the housing in the transverse direction.

3. The portable electronic device of claim 1, wherein the housing has a top surface and a bottom surface, the button hole is formed in the top surface of the housing, and
   wherein the top surface of the housing and a top surface of the top button have a curved shape in the first direction where opposite ends of the curved shape of the top surface of the housing and the top surface of the top button are inclined downward from a central portion.

4. The portable electronic device of claim 1, wherein the button seating portion is a stepped groove having a pair of open ends in the first direction.

5. The portable electronic device of claim 4, wherein the housing comprises:
   an upper case defining the top surface and an upper lateral wall of the housing; and
   a lower case defining a lower lateral wall and a bottom surface of the housing,
   wherein the depth of the button seating portion corresponds to a thickness of the upper lateral wall of the upper case and a portion of the upper lateral wall is omitted at opposite ends of the button seating portion.

6. The portable electronic device of claim 5, wherein an end of the upper lateral wall and an end of the lower lateral wall contact each other, and
   wherein the button seating portion has a gap at the open ends, the gap exposing the end of the lower lateral wall.

7. The portable electronic device of claim 6, wherein the top button includes a pair of ends in the first direction, the pair of ends contacting the end of the lower lateral wall, and the top button covers the gap.

8. The portable electronic device of claim 1, further comprising a liquid collecting groove formed in the button seating portion adjacent the button hole.

9. The portable electronic device of claim 8, wherein the liquid collecting groove is extended in the second direction.

10. The portable electronic device of claim 1, further comprising:
   a first coupling projection projecting from the bottom surface of the top button; and
   a first coupling hole formed in the button frame, the first coupling hole corresponding to the first coupling projection.

11. The portable electronic device of claim 1, further comprising:
   a second coupling projection projecting inwardly from a top portion of the housing; and
   a second coupling hole formed in the another portion of the button frame, the second coupling hole corresponding to the second coupling projection.

12. The portable electronic device of claim 1, further comprising an elastic band having a pair of ends, the elastic band having a polygonal cross section,
   wherein the housing is provided as a pair of housings connected to the pair of ends of the elastic band.

13. The portable electronic device of claim 12, wherein the elastic band includes a tube shaped member having an internal space, and
   wherein a cross sectional shape of the internal space of the tube shaped member is asymmetrically arranged with respect to the outer perimeter of the tube shaped member such that a thickness of the tube shaped member varies between an outer perimeter of the tube shaped member and the internal space of the tube shaped member.

14. The portable electronic device of claim 13, wherein the cross section of the outer perimeter of the tube shaped member is rectangular, and
   wherein the cross sectional shape of the internal space of the tube shaped member is a rhombus shape inclined with respect to the cross section of the outer perimeter of the tube shaped member.

15. The portable electronic device of claim 13, further comprising:
a signal wire transceiving a signal between internal electronic components mounted in the pair of housings, the signal wire being located in each internal space of the tube shaped member; and
at least one cable holder arranged in each internal space of the tube shaped member, an outer perimeter of the at least one cable holder corresponding to the cross sectional shape of each internal space of the tube shaped member, and
wherein the at least one cable holder has a hole through which the signal wire passes.

16. A portable electronic device comprising:
an elastic band having a pair of ends, the elastic band being generally
C-shaped, and the elastic band having a polygonal cross section; and
a pair of housings connected to the pair of ends of the elastic band, each housing including:
 a button hole formed in the housing; and
 a button unit provided in the button hole of the housing, wherein the button unit includes:
  a top button coupled to the housing to cover the button hole, the top button having a first length in a first direction that is longer than a second length in a second direction thereof, and the top button having an exposed top surface and a bottom surface;
  a button frame provided in the housing, one portion of the button frame being coupled to the bottom surface of the top button, another portion of the button frame being located in the internal space of the housing and coupled to the housing, and a bottom surface of the button frame having an actuator projecting therefrom;
  a first coupling projection projecting from the bottom surface of the top button;
  a first coupling hole formed in the button frame, the first coupling hole corresponding to the first coupling projection; and
  a dome switch pressable by the actuator to generate a signal when the top button is pressed.

17. The portable electronic device of claim 16, wherein the elastic band includes a tube shaped member having an internal space, and
wherein a cross sectional shape of the internal space of the tube shaped member is asymmetrically arranged with respect to the outer perimeter of the tube shaped member such that a thickness of the tube shaped member varies between an outer perimeter of the tube shaped member and the internal space of the tube shaped member.

18. The portable electronic device of claim 17, wherein the cross section of the outer perimeter of the tube shaped member is rectangular, and
wherein the cross sectional shape of the internal space of the tube shaped member is a rhombus shape inclined with respect to the cross section of the outer perimeter of the tube shaped member.

* * * * *